United States Patent [19]

Uyama

[11] Patent Number: 5,163,355
[45] Date of Patent: Nov. 17, 1992

[54] NEGATIVE PRESSURE BOOSTER EQUIPMENT

[75] Inventor: Shintaro Uyama, Higashimatsuyama, Japan

[73] Assignee: Jidosha Kiki Co., Ltd., Tokyo, Japan

[21] Appl. No.: 639,845

[22] Filed: Jan. 11, 1991

[30] Foreign Application Priority Data

Jan. 24, 1990 [JP] Japan ................. 2-5511[U]

[51] Int. Cl.⁵ ................. F16J 3/02
[52] U.S. Cl. ................. 92/98 D; 92/99
[58] Field of Search ........... 188/356; 91/376 R, 369.1, 91/369.2; 92/48, 49, 98 D, 98 R, 99

[56] References Cited

U.S. PATENT DOCUMENTS

| | | | |
|---|---|---|---|
| 4,495,854 | 1/1985 | Hibino | 92/48 X |
| 4,516,474 | 5/1985 | Ochiai | 92/48 X |
| 4,587,889 | 5/1986 | Ohki et al. | 92/98 D |
| 4,811,653 | 3/1989 | Kobayashi et al. | 92/98 D |
| 4,881,451 | 11/1989 | Newhouse | 92/48 |
| 5,025,709 | 6/1991 | Miyazaki | 92/48 |

Primary Examiner—Mitchell J. Hill
Assistant Examiner—Carla Mattix
Attorney, Agent, or Firm—Varndell Legal Group

[57] ABSTRACT

According to the present invention, a rotation preventive portion for preventing the rotation of bead portion, such as a stepped projection, is provided on the bead portion of diaphragm, which is squeezed between a front shell and a rear shell. When the front shell and the rear shell are assembled with such a diaphragm, the rotation of the bead portion is prevented by this rotation preventive portion (stepped bead). As the result, outer lip of the bead portion of diaphragm or the rolling portion of diaphragm are not squeezed between the front shell and the rear shell, and the front shell and the rear shell can be assembled without damaging or breaking the diaphragm.

14 Claims, 3 Drawing Sheets

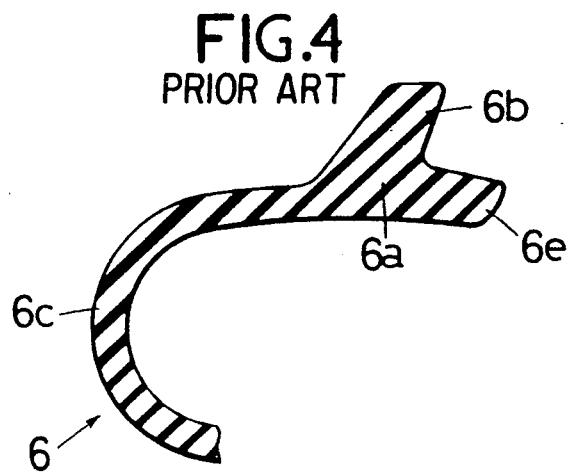
FIG. 4 PRIOR ART
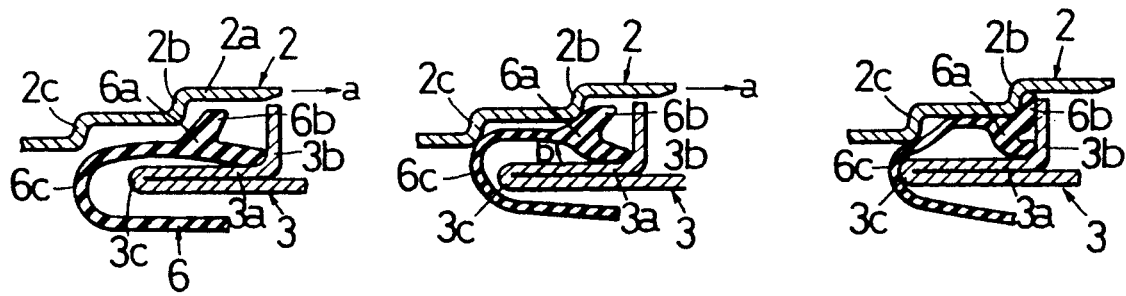
FIG. 5(a) PRIOR ART
FIG. 5(b) PRIOR ART
FIG. 5(c) PRIOR ART

NEGATIVE PRESSURE BOOSTER EQUIPMENT

BACKGROUND OF THE INVENTION

The present invention relates to a negative pressure booster for brake boosters and, in particular, to a negative pressure booster provided with a diaphragm, where the bead portion of the diaphragm is squeezed between a front shell and a rear shell.

Many types of brake booster utilizing negative pressure have been used on automobiles in the past in order to obtain a higher braking power with a smaller pushing force on brake pedal. A typical example of a brake booster 1 is shown in FIG. 3.

As it is evident from FIG. 3, this brake booster 1 has a front shell 2 and a rear shell 3. A valve body 4 passes through the rear shell 3, and the valve body 4 is airtightly and slidably supported on the rear shell 3. A power piston 5 is provided between the valve body 4 and each of the shells 2 and 3, and the power piston 5 is provided with a diaphragm 6. The space formed by the shells 2 and 3 is divided into a constant pressure chamber 7 and a variable pressure chamber 8 by the diaphragm 6. The constant pressure chamber 7 communicates with the intake manifold of engine (not shown) through a negative pressure leading pipe 9, so that negative pressure can be introduced at all times.

In the cavity of the valve body 4, a control valve 10 is provided, and this control valve 10 controls the communication or the interruption of the variable pressure chamber 8 and the constant pressure chamber 7 with atmospheric air. The control valve 10 is controlled by an input shaft 11 connected to a brake pedal (not shown). Further, on the forward end of the valve body 4, an output shaft 13 is slidably mounted through a reaction disk 12, and this output shaft 13 passes airtightly and slidably through the front shell 2 and protrudes outside the brake booster and operates the piston of brake master cylinder (not shown).

When not operating, the variable pressure chamber 8 is at least shut off from the atmospheric air. When the brake pedal is depressed, the input shaft 11 moves forward, and the control valve 10 is switched over. Then, the atmospheric air flows into the variable pressure chamber 8 and exerts action on the power piston 5. Power piston 5 is thus operated, and by the action of this power piston 5, output shaft 13 moves forward and operates the piston of the master cylinder (not shown). As the result, the braking action is performed.

In such type of brake booster 1, the two shells 2 and 3 are connected together generally by holding the peripheral portions of front shell 2 and rear shell 3 together. In this case, a bead portion 6a of diaphragm 6 is present between the peripheral portions of two shells 2 and 3, and the bead portion 6a is squeezed by two shells 2 and 3.

As shown in FIG. 4, the bead portion 6a of the diaphragm 6 is furnished with an outer lip 6b, and this outer lip 6b prevents the leaking of atmospheric air into the constant pressure chamber 7.

However, when the front shell 2 and rear shell 3 are assembled in such conventional type brake booster 1 as shown in FIGS. 5(a)-5(c), the front shell 2 is moved rightward as shown by an arrow "a" with the bead portion 6a of diaphragm 6 placed between peripheral portion 2a of front shell 2 and peripheral portion 3a of rear shell 3. Then, the first step 2b formed on the front shell 2 is brought into contact with the outer lip 6b as shown in FIG. 5 (b). When the front shell 2 is moved toward the direction of the arrow "a" under such condition, the bead portion 6a begins to rotate in the direction of the arrow "b". If the front shell 2 is further moved in the same direction a, the bead unit 6a is extensively rotated as shown in FIG. 5 (c). This results in outer lip 6b being pulled toward the marginal flange 3b of the rear shell 3 and being squeezed between the first step 2b of the front shell 2 and the marginal flange 3b of the rear shell 3. As the result, outer lip 6b is often damaged or broken.

As shown in FIG. 5 (c), the rolling portion 6c of the diaphragm 6 is also squeezed between the second step 2c formed by the front shell 2 and the folded portion 3c of the rear shell 3. Thus, the rolling portion 6c is often damaged or broken.

Therefore, care must be taken not to break the diaphragm 6 when front shell 2 and rear shell 3 are assembled. This requires much time for assembling, thereby reducing working efficiency.

SUMMARY OF THE INVENTION

The object of the present invention is to provide a structure for a negative pressure booster, which can prevent damage to the diaphragm during assembly, so that the front shell and the rear shell can be assembly with higher working efficiency.

To attain the above object, the equipment according to the present invention is characterized in that a rotation preventive Portion for preventing the rotation of the bead portion is provided on the bead portion of the diaphragm, which is squeezed between front shell and rear shell.

Also, the equipment according to the present invention is characterized in that said bead portion is furnished at least with an outer lip and said rotation preventive portion is provided on the front side of the outer lip.

Further, the equipment of the present invention is characterized in that said rotation preventive portion is formed in such manner that, when said front shell and said rear shell are assembled, a predetermined gap is maintained between said front shell and said rotation preventive portion until said front shell is brought into contact with said outer lip.

Further, the equipment of the present invention is characterized in that said bead portion is furnished with an inner lip and that the innermost peripheral end of this inner lip protrudes in the direction of inner diameter in relation to the inner peripheral surface of said rotation preventive portion.

In the negative booster according to the present invention with such arrangement, the rotation of bead unit is prevented by the rotation preventive portion when front shell and rear shell are assembled. As the result, the outer lip of the bead portion of diaphragm or the rolling portion of the diaphragm are not squeezed between front shell and rear shell, and front shell and rear shell can be assembled without damaging or breaking the diaphragm.

With a predetermined gap maintained between said front shell and said rotation preventive portion. The front shell and the rotation preventive portion are not brought in touch with each other until the front shell touches the outer lip.

Further, because the inner most peripheral end of the inner lip of the bead portion is protruding in the direction of inner diameter, the bead portion escapes toward the direction of inner diameter even when front shell slightly hits the rotation preventive portion during assembling. Thus, front shell and rear shell are assembled perfectly and smoothly.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is a partial cross-sectional view of a conventional type diaphragm;

FIGS. 5(a)-5(c) is a drawing to explain the assembling of shells in a conventional type brake booster.

DESCRIPTION OF THE PREFERRED EMBODIMENT

In the following, description is given on an embodiment of this invention in connection with the drawings.

Figure 1:
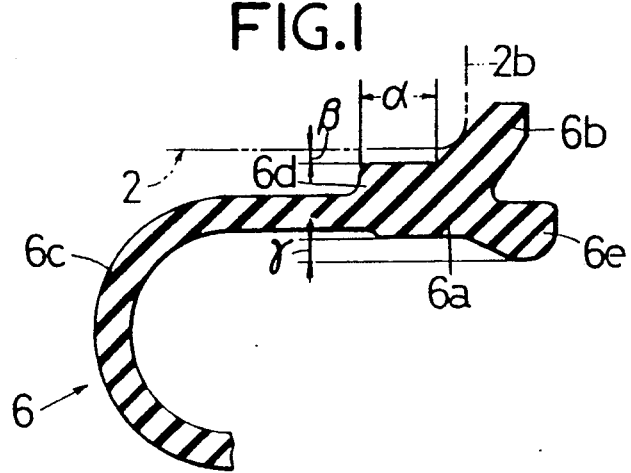
FIG. 1 is a cross-sectional view of diaphragm used in an embodiment of negative pressure booster according to the present invention.
Figure 3:
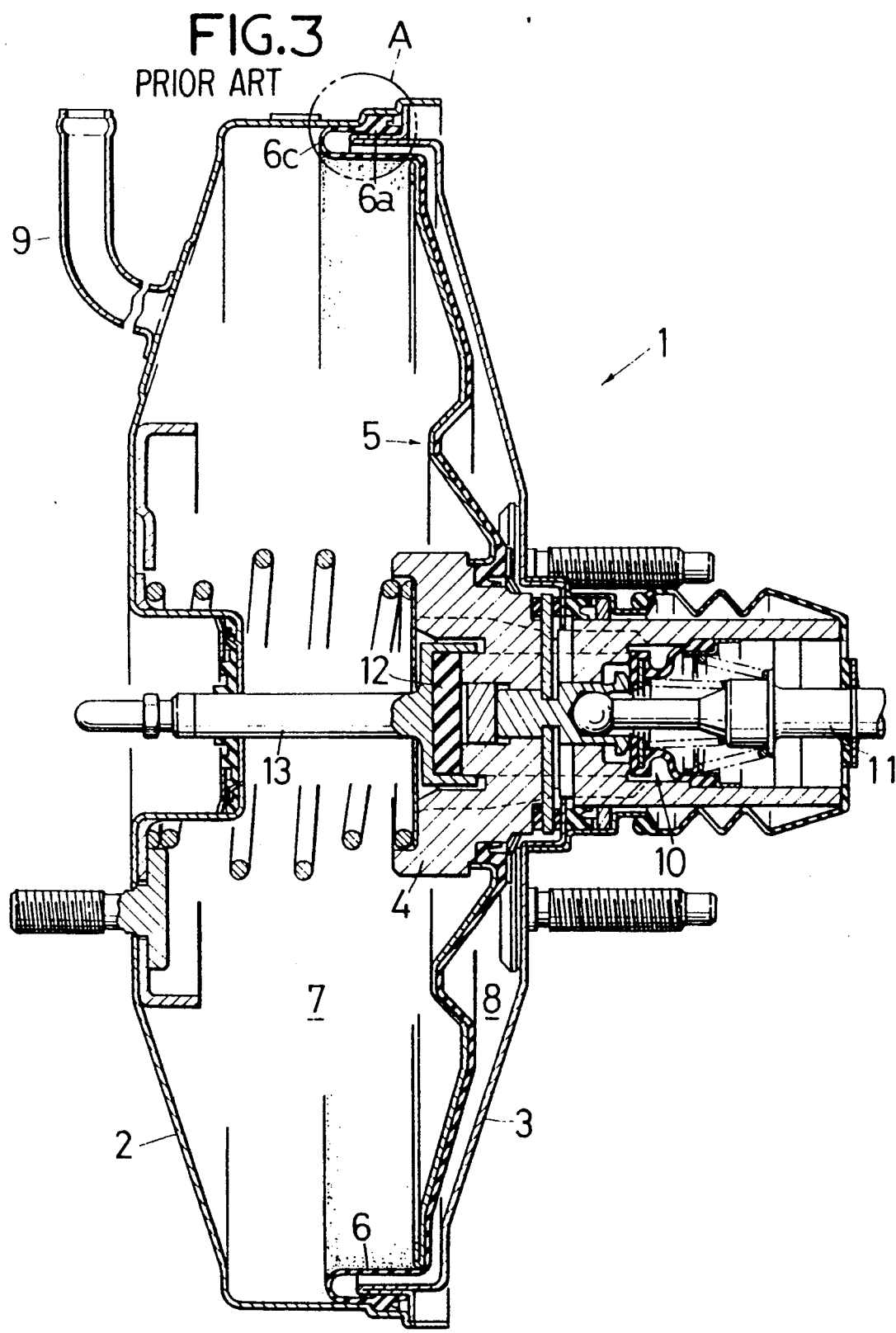
FIG. 3 is a cross-sectional view of an example of a conventional type brake booster using negative pressure.

FIG. 1 partially shows the diaphragm, which is used in an embodiment of the negative pressure booster according to the present invention, and it is a partial cross-sectional view of the portion A in FIG. 3. The components on the portion not shown in FIG. 1 are the same as the components of the conventional type negative pressure booster in FIG. 3, and the operation of the components are also the same. Thus, detailed description for these components are not given here. The same component as that of the conventional type negative pressure booster is referred by the same symbol, and the description is not given.

As shown in FIG. 1, the rotation preventive unit 6d of the predetermined length α is furnished on the front side (left side in the figure) of outer lip 6b of the bead portion 6a, and the upper surface of the rotation preventive portion 6d is formed as a flat surface. As shown in FIG. 1, the rotation preventive unit 6d can have the shape of a step (i.e., a stepped projection). When the first step 2b of the front shell 2 is brought into contact with outer lip 6b during assembling, a gap β is formed between the upper surface of the rotation preventive unit 6d and the lower surface of the front shell 2. As the result, the front shell 2 does not hit the rotation preventive portion 6d until the front shell 2 touches the outer lip 6b and the bead portion 6a begins to rotate. Also, the lower surface of the rotation preventive portion 6d is also flat, and the innermost peripheral end of the inner lip 6e is protruding toward the direction of the inner diameter by a predetermined distance γ to the lower surface of the rotation preventive portion. Thus, even when the front shell 2 slightly hits the rotation preventive portion 6d before it touches the outer lip 6b, the bead portion 6a can escape in the direction of the inner diameter.

Figure 2A:
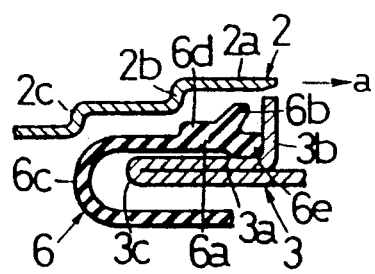
FIGS. 2(a)-2(c) is a drawing to explain the assembling of shells in the above embodiment.
Figure 2B:
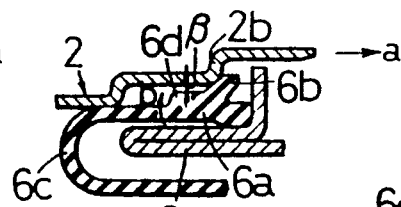
Figure 2C:
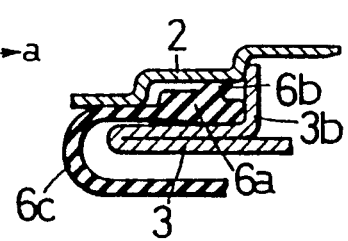

When front shell 2 and rear shell 3 are assembled in the brake booster 1 of the present embodiment with such arrangement, the front shell 2 is moved toward the direction of the arrow "a" as shown in FIG. 2 (a), and the first step 2b touches the outer lip 6b as shown in FIG. 2 (b). In this case, the front shell 2 rarely hits the rotation preventive portion 6d because a gap β is provided between the front shell 2 and the rotation preventive portion 6d. Even when the front shell 2 slightly hits the rotation preventive portion 6d, the bead portion 6a is bent toward the direction of inner diameter and escapes because the innermost peripheral end of inner lip 6e is protruding toward the direction of inner diameter by the predetermined distance γ and a gap (approximately equal to γ) is provided between the peripheral portion 3a of rear shell 3 and the rotation preventive portion 6d. Accordingly, the front shell 2 can move in the direction of "a" until it touches outer lip 6b.

When the front shell 2 is moved further in the direction "a" after the front shell 2 is brought in touch with the outer lip 6b, the bead portion 6b is rotated. When the bead portion 6b is rotated by the degree as determined by the gap β, the rotation preventive portion 6d touches the front shell 2, and the bead portion 6b is prevented from rotating further. Therefore, even when the front shell 2 moves in the direction "a", the outer lip 6b is not pulled in, and outer lip 6b is not squeezed between the two shells 2 and 3. Because the bead portion 6b is rotated only by the predetermined degree, the rolling unit 6c of the diaphragm 6 is not squeezed between two shells 2 and 3 as shown in FIG. 2 (c). Thus, two shells 2 and 3 and the diaphragm 6 are assembled without squeezing outer lip 6b and rolling portion 6c between two shells 2 and 3.

As the result, the damage or breakage of diaphragm 6 is perfectly prevented during assembling. Because the two shells 2 and 3 can be assembled without taking special care on damage or breakage, assembling can be performed simply and efficiently.

During assembling, a lubricant has been used in the past to ensure the better sliding of front shell 2 and bead portion 6b. However, because the rotation of the bead portion 6b is prevented by the structure of the present invention, there is no need to have better sliding between front shell 2 and the bead portion 6b. This results in the reduction of the quantity of the lubricant used.

Because the bead portion 6b is prevented from rotating and can be assembled in a stable form, the better sealing can be attained by the bead portion 6b.

The present invention is not limited to the above embodiment, and various design modifications can be conceived.

For example, a description has been given in the above embodiment on the case where the invention is applied to a negative pressure booster of single power piston type, whereas it is needless to say that the invention can be applied to a tandem type negative pressure booster consisting of a plurality of power pistons.

Also, a description has been given in the above on the case where the negative pressure booster of this invention is applied to a brake booster, whereas the present invention can also be applied to the other boosters such as clutch booster.

As it is evident from the above description, it is possible by the negative pressure booster according to the present invention to prevent damage or breakage of diaphragm during assembly thereof because a rotation preventive portion is furnished on the front side of the bead portion of the diaphragm, and the assembling can be accomplished with a higher efficiency.

Because the rotation of the bead portion is prevented, it is possible to reduce the quantity of the lubricant used between the front shell and the bead portion during assembly, and the assembly of the brake booster with the bead portion can be carried out in a stable manner so as to insure the better sealing.

What we claim is:

1. A negative pressure booster, which comprises a power piston including a diaphragm having a bead squeezed between a portion of an outer first shell and a portion of an inner second shell, a space formed by said first and second shell being divided into a constant pressure chamber and a variable pressure chamber, a pressure difference being generated between said constant pressure chamber and said variable pressure chamber and said power piston being operated by said pressure difference, wherein said bead includes a stepped projection extending toward said first shell for preventing rotation of said bead during assembly of said negative pressure booster.

2. The negative pressure booster according to claim 1, wherein said bead is arranged at an end of said diaphragm.

3. The negative pressure booster according to claim 1, wherein said stepped projection includes a first raised portion extending toward said first shell and a second raised portion extending from said first raised portion toward said first shell.

4. The negative pressure booster according to claim 3, wherein a gap is provided between said first raised portion and said first shell for preventing said bead from rotating when said first and second shells are assembled.

5. The negative pressure booster according to claim 1, wherein said bead includes another projection extending toward said second shell.

6. The negative pressure booster according to claim 5, wherein said another projection is a stepped projection.

7. The negative pressure booster according to claim 2, wherein said bed includes another projection extending towards said second shell.

8. The negative pressure booster according to claim 7, wherein said another projection is a stepped projection.

9. The negative pressure booster according to claim 3, wherein said bead includes another projection extending toward said second shell.

10. The negative pressure booster according to claim 9, wherein said another projection is a stepped projection.

11. The negative pressure booster according to claim 4, wherein said bead includes another projection extending towards second shell.

12. The method according to claim 11, wherein said another projection is a stepped projection.

13. The negative pressure booster according to claim 3, wherein said first raised portion is parallel to an adjoining surface of said first shell and said second raised portion increases in height at an angle to said adjoining surface.

14. The negative pressure booster according to claim 5, wherein said stepped projection and said another projection together form a forked-shaped end of said diaphragm.

* * * * *